July 30, 1935. R. L. UHL 2,009,792
COOKING APPARATUS
Filed July 28, 1934
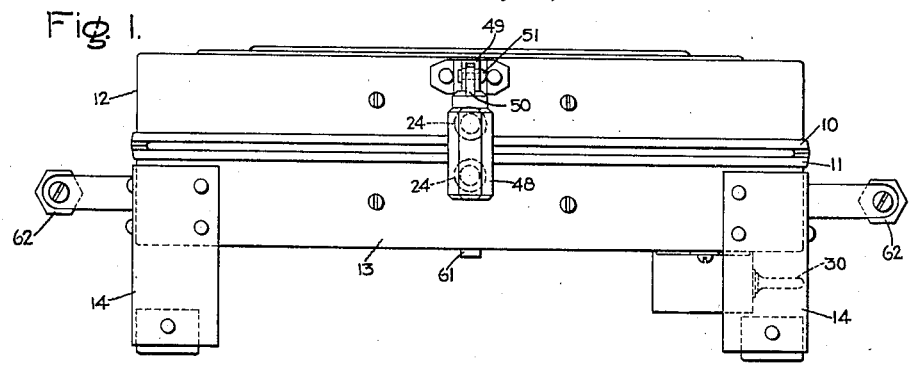
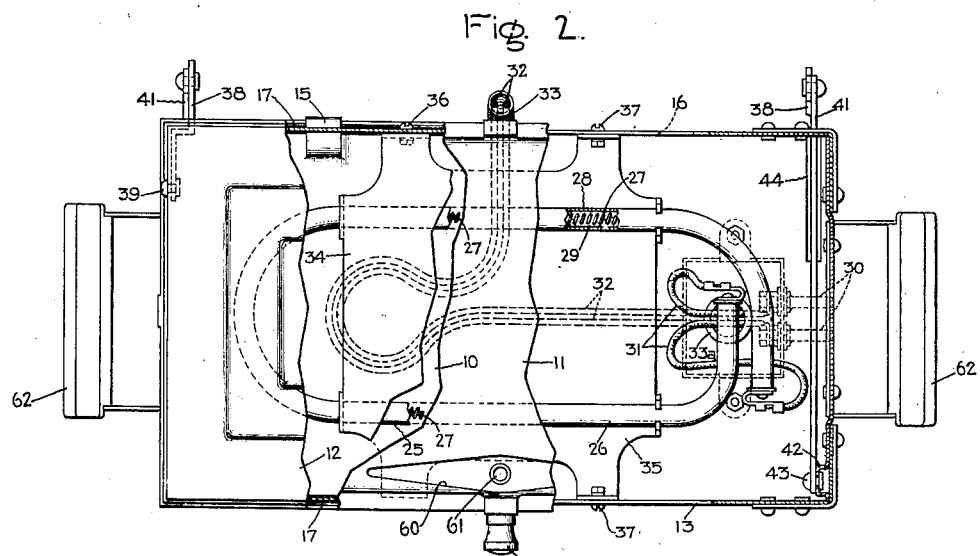
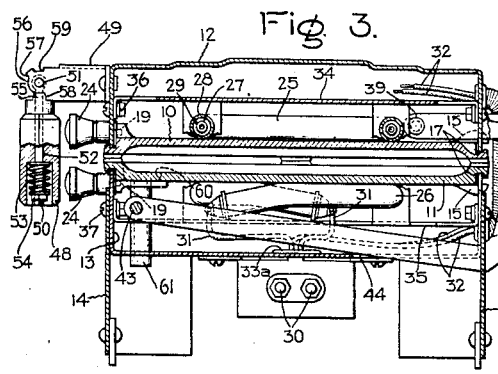
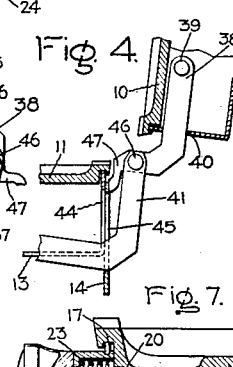
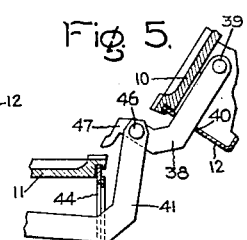
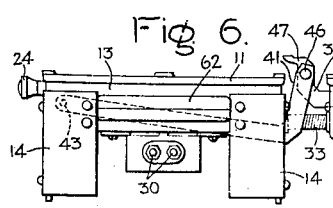
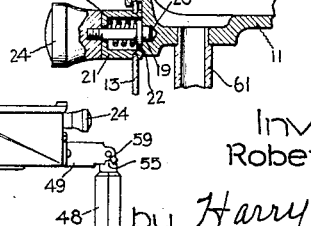
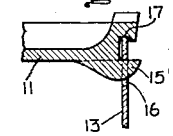
Inventor:
Robert L. Uhl,
by Harry E. Dunham
His Attorney.

Patented July 30, 1935

2,009,792

UNITED STATES PATENT OFFICE 2,009,792

COOKING APPARATUS

Robert L. Uhl, Ontario, Calif., assignor to General Electric Company, a corporation of New York Application July 28, 1934, Serial No. 737,420

6 Claims. (Cl. 53—5)

This invention relates to cooking apparatus, more particularly to cooking apparatus provided with a plurality of separable cooking plates, and it has for its object the provision of an improved device of this character.

This invention has special application to cooking apparatus provided with a pair of superposed, separable, electrically heated cooking plates, and it has for a further object the provision of means whereby the utility of the apparatus is increased and its functions extended. More specifically, this invention contemplates the provision of electric cooking apparatus of this character for effecting in an efficient and economical manner such cooking operations as toasting sandwiches and broiling meat and the like, and further, the provision of means whereby griddle cakes and like edibles can be conveniently baked.

In carrying this invention into effect in one form thereof, the cooking apparatus is provided with a pair of superposed cooking plates, which will be heated by electricity, such as by means of heating elements carried by the plates. The plates are connected together by improved hinge means whereby they can be supported in substantially parallel relation to each other at various distances apart so that sandwiches, steaks, etc. of varying thickness can be conveniently cooked between the plates. In addition to this, the hinge means are arranged so that the upper plate can be moved to a vertical open position with reference to the lower plate, and, moreover, can be moved to a second open position wherein the upper plate is supported substantially in the same plane as the lower plate. When the upper plate is thus positioned, both of the surfaces are available for baking griddle cakes and the like wherein flat cooking surfaces are desired.

The upper plate is provided with a pendant handle which is arranged to move freely between a pendant vertical position and another position whereby the upper plate can be conveniently moved to its substantially vertical open position, and to the second open position wherein it lies substantially in the plane of the lower plate. In addition to this, suitable means are provided for locking the pendant handle in still another position wherein it serves as a leg for supporting the outer edge of the upper heating plate when in its second open position. The hinge means are arranged to support the inner edge of the upper plate when it is in its second open position.

For a more complete understanding of this invention, reference should be had to the accompanying drawing in which Fig. 1 is a front elevation of electrically heated cooking apparatus embodying this invention; Fig. 2 is a plan view of the apparatus shown in Fig. 1, portions being broken away and portions being shown in section so as to illustrate certain details of construction; Fig. 3 is a side elevation in section of the cooking apparatus shown in Figs. 1 and 2; Fig. 4 is a fragmentary view illustrating hinge means provided in the cooking apparatus of this invention arranged to connect the upper and lower plates together, the upper cooking plate being shown in a vertical open position; Fig. 5 is a view similar to Fig. 4, but illustrating the manner in which the hinge means is operated to release the upper cooking plate from its open position shown in Fig. 4 so that it can be moved to a second position wherein its cooking surface lies substantially in the plane of the cooking surface of the lower plate; Fig. 6 illustrates the upper plate in this second open position, and the pendant handle supporting the upper cooking plate at its outer or front edge; and Figs. 7 and 8 are details of construction illustrating the manner in which the cooking plates are supported in suitable casings.

Referring to the drawing, this invention has been shown as applied to electric cooking apparatus comprising upper and lower cooking or heating plates 10 and 11. The upper heating plate 10 is mounted within a casing 12, while the lower plate 11 is mounted within a casing 13 which is supported on legs 14 and which constitutes a base for the heating plates.

The plates 10 and 11 are detachably secured in their respective casings. For this purpose, each plate is provided at its rear with a pair of spaced lugs 15 which are received in a pair of apertures 16 provided for them in the rear wall of the associated casing, and which also is provided with a peripheral channel 17 arranged to receive the edges of the associated casing, as clearly shown in Figs. 3 and 8. Each plate is locked at the front by means of a locking device comprising a pin or plunger 19 (Fig. 7) which is received in an aperture 20 provided for it in the front edge of the associated heating plate. This pin is mounted in a cylinder 21 which is rigidly secured in an aperture 22 provided for it in the associated front wall of the casing. This cylinder receives a compression spring 23 arranged to force the plunger 19 inwardly toward the heating plates, as shown in Fig. 7. The pin is withdrawn to release the heating plate by means of a knob 24 rigidly secured to the pin in any suitable manner as by means of threads, as shown in Fig. 7. In order to remove a heating plate, it is merely necessary to withdraw the associated pin 19 from its aperture 20 and then swing the plate with reference to its casing so as to remove the lugs 15 from their slots 16 at the rear and then remove the plate bodily from its casing. In order to reassemble the plate with its casing, it is merely necessary to move the plate so as to cause the lugs 15 to enter their apertures 16 with the channel 17 receiving the upper edge of the rear wall of the casing, and then move the front edge of the plate into its casing while holding the associated pin 19 in its outward or retracted position until the plate has been moved into position, whereupon the knob 24 can be released to allow the pin 19 to lock the plate.

The plates 10 and 11 are heated by means of suitable heating elements 25 and 26 respectively which may be of any suitable type, but which preferably will be of the sheathed type, such as described and claimed in United States patent to C. C. Abbott No. 1,367,341, dated February 1, 1921. Briefly, this element comprises a helical resistance element 27 encased by a metallic sheath 28 which is embedded in and supported in spaced relation with reference to the sheath by means of a suitable heat refractory electrically insulating material 29, such as powdered magnesium oxide.

The heating elements are shaped alike, each having the form of an elongated oval. The left-hand portion of the oval, shown in Fig. 2, is the left-hand part of the upper heating element 25, while the right-hand portion of the oval shown in this figure is completed by the right-hand portion of the lower heating element 26. The ends of each heating element overlap as shown in the case of the lower element 26. This arrangement of the heating elements provides for a very even distribution of heat over the heating plates 10 and 11. The terminals for the lower heating element 26 are electrically connected to terminal pins 30 for receiving the supply receptacle of a twin supply cord by means of leads 31, while the terminals of the upper heating element 25 for the upper plate are electrically connected with these terminal pins by means of leads 32. These latter leads pass out through the rear of the upper casing 12 and thence downwardly into the lower casing 13, as clearly shown in Figs. 2 and 3. Preferably, the portions of the leads 32 on the exterior of the casing are covered by means of a suitable flexible conduit 33. It will be understood that the rear walls of the casing 12 and 13 will be provided with apertures for receiving the conduit 33. Preferably, the conduit 33 will be rigidly secured to the lower casing and will be arranged to slide inwardly of the upper casing so that when the upper plate is moved to the position in the plane of the lower heating plate, as shown in Fig. 6, the conduit 33 will move into the upper casing. The terminal pins 30 are supported below the bottom wall of the lower casing, and the leads 31 and 32 are directed to the terminals through a bushing 33a provided in the bottom wall.

The heating elements 25 and 26 are supported within their casings in any suitable manner, such as by means of supporting saddles 34 and 35 respectively of similar shape and secured to their associated casings by means of screw fastening means 36 and 37 respectively.

As pointed out previously, the upper plate 10 is hingedly secured to the lower plate 11 so that the upper plate can be supported in substantially parallel relation with the lower plate at varying distances from the lower plate in order to accommodate sandwiches, steaks, etc. of varying thickness. It is also contemplated that the upper plate can be moved from its closed position shown in Fig. 3 to an open vertical position shown in Fig. 4 where it is supported by the hinge means, and further, be moved to a second open position shown in Fig. 6 wherein the two plates lie substantially in the same plane.

The hinge means comprises a pair of L-shaped hinge lugs 38 arranged with the long legs of the L attached to the inner side walls of the upper casing 12 by means of rivets or like members 39. The hinge lugs 38, as shown, extend from the rear wall of the casing 12 through apertures 40 provided for them in the wall and arranged to prevent movement of the lugs about their rivets 39. The hinge lugs 38 are pivotally secured to hinge links 41. The links 41 are also of L-shape, and as shown are pivotally mounted within the lower casing 13 adjacent its front wall. The front ends of the long legs of the links 41 are pivoted to indentations 42, formed in the walls of the lower casing 13 at the front, by means of studs 43. The long legs of the links extend from the pivotal connections 43 at the front to the outside of the casing at the rear where the shorter legs of the links extend upwardly to meet the downwardly extending shorter legs of the hinge lugs 38, as clearly shown in Figs. 3–6 inclusive. As shown in these figures, the bottom end walls of the casing 13 are provided with slotted openings 44 receiving the links 41 and providing for limited vertical movement of the links from their lower positions shown in Fig. 3. The legs 14 at the rear are provided with slots 45 aligned with the slots 44 for receiving the links 41 and providing for their vertical motion.

The short legs of the links 41 are pivotally connected to the intermediate portions of those of the lugs 38 by means of pivot pins 46. Below the pivot pins 46, the hinge lugs 38 are provided with abutments 47 for a purpose to be described in greater detail hereinafter.

A pendant handle 48 is attached to the front wall of the upper casing 12 whereby the upper heating plate 10 can be moved from its closed to its open positions. This handle is secured to a bracket 49 overhanging the front wall of the casing by means of a rod 50 (Fig. 3). The rod 50 is pivotally secured to the bracket 49 by means of a pin 51. The rod 50 is received in an aperture or passageway 52 provided for it centrally of the handle 48. The handle 48 is biased into engagement with the bracket 49 by means of a compression spring 53, mounted within the handle so as to bear on the handle at one end and at the other end on a nut 54 carried by the lower end of the rod 50. At the upper end of the handle is arranged a latch or catch member 55 which bears against an arcuate surface 56 arranged on the bracket 49. At the ends of this surface are abutments 57 and 58 limiting the free pivotal movement of the handle 48 with reference to the bracket 49. The bracket 49 is further provided with a detent or notch 59 for receiving the catch 55 to lock the handle in a position substantially 180° from its position shown in Fig. 3. It will be understood that the handle can be moved to this position by withdrawing it sufficiently to permit the catch 55 to clear the abutment 57 so that when the handle has been moved to a position 180° from its position shown in Fig. 3, the handle can be released to permit the catch 55 to move within its locking notch 59.

In order to drain away juices, greases and the like, which arise during certain cooking operations, a suitable sump 60 is provided in the front of the lower plate 11. This sump is drained by means of a conduit 61. It will be understood that in the operation of the apparatus, a suitable dish or receptacle will be placed under the conduit to collect the juices, etc., draining from the plate.

The lower plate 13 is provided with handles 62 at its sides, whereby the grill as a whole can be conveniently moved from place to place.

In operation of the cooking apparatus, if it is desired to toast sandwiches, or to broil steaks, or to effect any other heating operation wherein it is desired to apply heat simultaneously to two sides of the edible, the handle 48 will be grasped by the attendant and moved on its pivot to the abutment 55 whereby the attendant can move the upper plate on the hinge links 41 to its vertical open position shown in Fig. 4. In this position, the abutments 47 on the hinge lugs 38 engage the rear wall of the legs 14 attached to the rear of the lower casing 13, as shown in Fig. 4, to support the upper plate in its vertical position. The edibles to be cooked are then placed upon the lower plate 11 and the handle 48 again grasped to move the plate 10 so as to rest it upon the edibles to be cooked. It will be understood that the links 41 permit the edibles to support the upper plate in parallel relation with reference to the lower plate and at a distance from the lower plate depending upon the thickness of the edibles. After the edibles have been toasted or cooked, as the case may be, the upper plate again is moved to its open position shown in Fig. 4, and the edibles removed. Another batch of edibles may then be cooked in a similar manner.

If it is desired to use both of the plates as flat surfaces in order to bake griddle cakes and the like, the upper plate 10 is moved to its position shown in Fig. 6 wherein it lies substantially in the plane of the lower plate 11. In order to do this, the handle 48 is grasped and manipulated to move the upper plate 10 substantially to its position shown in Fig. 4 wherein the abutments 47 engage the rear of the base, and is then elevated bodily to the position shown in Fig. 5 wherein the abutments 47 clear the lower plate 11, and then is rotated on the links 41 to the position shown in Fig. 6. In this position, the plate 10 is supported at its rear by means of the links 41 which engage the lower ends of the slots 45 provided in the legs 14, and is supported at its outer end by means of the handle 48, which as previously described, will be locked in the notch 59 180° from its position shown in Fig. 3. It will be understood that if it were not for this locking of the handle to the plate it is quite possible that the plate might be jarred or knocked so as to cause it to fall from its cooking position. It will be understood that the handle 48 may be locked in its notch 59 either before the upper plate 10 is elevated and moved to this open position, or after this has been done.

It will be observed that I have provided a very reliable electric cooker wherein a large number of cooking operations can be effected. As pointed out previously, the device can be used to toast sandwiches, broil meat, or may be used to cook griddle cakes and the like when the plates are moved to their open position as shown in Fig. 6. It is also to be understood that in this position of the plates they can be used for frying operations in general.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:—

1. A grill comprising a pair of cooperating heating plates, means for heating said plates, hinge means connecting said plates together providing for relative movement of said plates to an open position, a handle secured to one of said plates arranged in one position of the handle to support the associated plate in an open position, and a latch carried by said handle arranged to engage a part of said one plate for locking said handle in its said supporting position.

2. An electric cooker comprising a pair of superposed cooking plates, electric heating elements carried by said plates arranged to heat said plates, legs connected to the lower of said plates supporting said plates in an elevated position, hinge means connecting said plates arranged so that the upper plate can be swung to an open position wherein its cooking surface lies substantially in the plane of the cooking surface of said lower plate, a pendant handle pivotally connected to said upper plate movable to a position wherein it will support said upper plate in said open position, and a latch carried by said handle arranged to be received in a detent provided for it on said upper plate so as to lock said handle in said position.

3. An electric cooker comprising a pair of superposed cooking plates, electric heating elements carried by said plates arranged to heat said plates, legs supporting said plates in an elevated position, hinge means connecting said plates at the rear arranged so that the upper plate can be swung from its closed to a substantially vertical open position and also to a second open position substantially 180° from its closed position wherein its cooking surface lies substantially in the plane of the cooking surface of said lower plate, a pendant handle connected to said upper plate, a support overhanging the front wall of said plate, a rod pivotally mounted on said support, said handle being provided with a hole arranged longitudinally thereof to receive said rod, a spring between said handle and rod biasing said handle into engagement with said support, the handle being provided with a latch engaging said support, abutments on said support defining stops for said latch between which said handle is freely movable from its pendant position to a position at an angle thereto whereby said upper plate can be moved conveniently from its closed to either of said open positions, and a notch in said support arranged to lock said handle to said support in a position substantially 180° from its pendant position so that said handle functions as a leg to support said upper plate when moved to its second open position.

4. A grid comprising a pair of cooking plates arranged one above the other, hinge lugs secured to said upper plate, hinge links pivotally secured to said hinge lugs, and means pivotally securing said links beneath said lower plate and providing for movement of said links relative to said lower plate whereby said upper plate can be supported in substantially parallel relation at varying distances from said lower plate.

5. A grid comprising a base, a pair of superposed heating plates mounted on said base, a pair of hinge lugs rigidly secured to said upper plate at the rear, a pair of elongated hinge links pivoted substantially at the front of said base and extending to the rear thereof where they are pivotally secured to said hinge lugs, said links being movable between lower and upper limits of motion whereby said plates can be supported in substantially parallel relation at varying distances apart, said hinge lugs having abutments arranged to engage said base when said links are in their lower limiting positions and said upper plate is substantially in a vertical open position to support said upper plate in said vertical position and being released from said base to provide for movement of said upper plate to a second open position beyond said vertical position by elevating said upper plate and links a predetermined distance above said lower limiting position of said links whereby said abutments clear said base.

6. An electric grill comprising a base, a pair of superposed heating plates supported on said base in a horizontal position, electrical heating means for said plates, a pair of hinge lugs of substantially L-shape rigidly secured to said upper plate at the rear arranged with one leg of the L positioned substantially vertically back of said plate and directed downwardly toward said base, a pair of hinge links of substantially L-shape arranged with one leg pivotally secured to said base at the front thereof for vertical motion and extending to the rear of said base where the other legs of said links extend upwardly and back of said base to meet the vertical legs of said hinge lugs on said upper plate, means pivotally securing said legs at the back of said plates together, means limiting the vertical motion of said links in both upward and downward directions, said links providing for movement of said plates apart whereby said plates can be supported in substantially parallel relation at varying distances apart, said hinge lugs having abutments arranged to engage said base when said links are in their lower limiting positions and said upper plate is in a substantially vertical open position to support said plate in said vertical position and being releasable from said lower plate for movement to a second open position beyond said vertical position wherein said plates lie substantially in the same plane by elevating said upper plate to permit said abutments to clear said base, said links when in their lower positions supporting the rear edge of said upper plate in said second open position, and means supporting the front edge of said plate in said second position.

ROBERT L. UHL.